(12) United States Patent
Holicki et al.

(10) Patent No.: US 12,078,491 B2
(45) Date of Patent: Sep. 3, 2024

(54) SELF-LOCALIZATION OF A VEHICLE IN A PARKING INFRASTRUCTURE

(71) Applicants: Cariad SE, Wolfsburg (DE); Volkswagen Aktiengesellschaft, Wolfsburg (DE)

(72) Inventors: Michael Holicki, Berlin (DE); Ralph Hänsel, Berlin (DE); Timo Iken, Wolfsburg (DE); Christian Jördens, Braunschweig (DE); Roland Kube, Schwülper (DE); Carolin Last, Braunschweig (DE); Stefan Wappler, Berlin (DE)

(73) Assignee: Cariad SE, Wolfsburg (DE)

( * ) Notice: Subject to any disclaimer, the term of this patent is extended or adjusted under 35 U.S.C. 154(b) by 62 days.

(21) Appl. No.: 17/861,035

(22) Filed: Jul. 8, 2022

(65) Prior Publication Data

US 2023/0009978 A1 Jan. 12, 2023

(30) Foreign Application Priority Data

Jul. 9, 2021 (DE) .......................... 102021117741.3

(51) Int. Cl.
*G01C 21/30* (2006.01)
*G06T 7/73* (2017.01)

(52) U.S. Cl.
CPC ................ *G01C 21/30* (2013.01); *G06T 7/73* (2017.01); *G06T 2207/30256* (2013.01)

(58) Field of Classification Search
CPC .. G01C 21/30; G06T 7/73; G06T 2207/30256
See application file for complete search history.

(56) References Cited

U.S. PATENT DOCUMENTS

| 2015/0378015 A1* | 12/2015 | You .................. G01S 13/06 701/469 |
| 2020/0200545 A1 | 6/2020 | Wappler et al. | |

FOREIGN PATENT DOCUMENTS

| DE | 102014015073 A1 | 4/2016 |
| DE | 102015208228 A1 | 11/2016 |
| DE | 102016205867 A1 | 10/2017 |
| DE | 102017119236 A1 | 2/2019 |
| DE | 102018210765 A1 | 1/2020 |
| DE | 102018212998 A1 | 2/2020 |

\* cited by examiner

*Primary Examiner* — Andrew J Cromer
(74) *Attorney, Agent, or Firm* — Seed IP Law Group LLP (57) ABSTRACT

According to a method for self-localization of a vehicle, a first pose of the vehicle is determined. Environment sensor data are generated by means of an environment sensor device and on the basis of this a landmark is detected in the environment. A position of the landmark is determined and in dependence on this a second pose of the vehicle is determined. A memorized assignment instruction is consulted, matching up the first pose with at last one preferred sensor type or at least one dominant landmark type, and depending on this a first portion of the environment sensor data is selected that was generated by means of a first environment sensor system of the environment sensor device configured according to a first sensor type. For the detecting of the landmark, a first landmark detection algorithm is applied to the first portion of the environment sensor data.

9 Claims, 1 Drawing Sheet

SELF-LOCALIZATION OF A VEHICLE IN A PARKING INFRASTRUCTURE

BACKGROUND

Technical Field

Embodiments of the invention relate to a method for self-localization of a vehicle in a parking structure or infrastructure, wherein a first pose of the vehicle is determined in a map coordinates system of a digital map stored on a storage medium, environment sensor data are generated by means of an environment sensor device of the vehicle representing an environment of the vehicle, on the basis of the environment sensor data a landmark is detected in the environment and a position of the landmark is determined in the map coordinates system and a second pose of the vehicle is determined in the map coordinates system dependent on the position of the landmarks. Embodiments of the invention furthermore relate to a corresponding sensor device for a vehicle.

Description of the Related Art

Autonomous driving vehicles use suitable sensors and algorithms to determine their position and orientation continuously and can ascertain, by comparison with a digital map, that they are located in a passable area with no static obstacles. For this, a continuous detecting of the environment can be done during the drive with suitable environment sensor systems such as cameras, radar systems and lidar systems. The resulting digital pictures or data can be analyzed with the aid of suitable algorithms in order to recognize meaningful image contents, so-called features or landmarks, such as surfaces, walls, edges, ground marking lines and intersections of ground marking lines, and to determine their position.

The quality of the analysis results may vary with the sensor type given the same boundary conditions, so that in general several types of sensors will be used at the same time. This has the advantage that the vehicle position and orientation can still be calculated in parking infrastructure such as parking buildings in which the view is often impaired, as compared to public roads and highways.

The detection results can be compared by one or more sensor-specific localization algorithms against information of the digital map, describing the landmark type of the landmarks and their positions in the map coordinates system of the digital map, i.e., in particular inside the parking infrastructure. On the basis of the position of the detected landmarks obtained from the digital map, and taking into account the measured distance between the vehicle and the detected landmarks, the vehicle position and orientation are determined in the map coordinates system.

The operation of the environment sensor system and the localization algorithms results in increased energy consumption, which must be provided by the onboard network of the vehicle, as well as a high demand on computing resources.

Document US 2020/0200545 A1 describes a method for the detection of landmarks in which the detection of particular landmark types is confined to a portion of the detected environment data. For example, the vehicle is recognized as being stationary in one region of the image, there is no searching for ground marking lines, and so forth.

BRIEF SUMMARY

Some embodiments reduce the need for computer resources during the self-localization of a vehicle with the aid of environment sensor data.

Some embodiments include consulting a previously stored assignment instruction based on a first pose of a vehicle, which matches up the first portion of environment sensor data is selected, which have been generated by means of a first environment sensor system, configured according to a first sensor type. A corresponding first landmark detection algorithm is used in order to detect a landmark based on the first portion of the environment sensor data.

In some embodiments, a method is specified for self-localization of a vehicle in a parking infrastructure, wherein a first pose of the vehicle is determined in a map coordinates system of a digital map stored on a storage medium, especially that of the vehicle. An assignment instruction stored on the storage medium is consulted, in particular by means of the at least one computer unit, the assignment instruction matching up the first pose with at least one preferred sensor type or at least one dominant landmark type, especially a dominant landmark type in an environment of the first pose. Environment sensor data are generated by means of an environment sensor device of the vehicle, representing an environment of the vehicle. A first portion of the environment sensor data that was generated by means of a first environment sensor system of the environment sensor device which is configured according to a first sensor type is selected, especially by means of a computer unit, in dependence on the consulted assignment instruction, i.e., in particular in dependence on the matching up of the first pose with the at least one preferred sensor type or the at least one dominant landmark type. A landmark in the environment of the vehicle is detected, especially by means of a computer unit, based on the environment sensor data, and a position of the landmark is determined in the map coordinates system. For the detecting of the landmark, a first landmark detection algorithm is applied to the first portion of the environment sensor data. A second pose of the vehicle is determined in the map coordinates system, especially by means of the at least one computer unit, in dependence on the position of the landmark and optionally in dependence on the first pose. The vehicle is in particular configured as a motor vehicle, such as an automobile.

Self-localization can be understood to mean, in particular, that the vehicle itself, especially the at least one computer unit, determines the second pose. The first pose may likewise be determined previously by the vehicle, especially the at least one computer unit. The determination of the first pose may be done in familiar manner, i.e., for example by using the first and/or second environment sensor system and/or another environment sensor system of the vehicle. The first pose can also be determined on the basis of geo-coordinates determined by means of a receiver for signals of a global navigation satellite system (GNSS), such as GPS, GLONASS, Galileo and/or Beidou. Alternatively, the first pose can also be provided in another way and provided to the at least one computer unit.

A pose here and in the following involves a position and can also involve an orientation, especially in the case of a pose of the vehicle, both of these in particular in the map coordinates system, unless otherwise stated. The first pose of the vehicle involves in particular a first position and a first orientation of the vehicle in the map coordinates system. The second pose of the vehicle involves in particular a second position and a second orientation of the vehicle in the map coordinates system. The vehicle has the first pose at a first time and the second pose at a second time, coming after the first time.

The parking infrastructure can be for example a parking structure, a parking place or some other parking area. The parking infrastructure has multiple parking places in which vehicles, especially motor vehicles, such as automobiles, can be parked. For example, it may be a parking infrastructure for valet parking, in which case the vehicle is brought by a human driver or user up to an entry zone of the parking infrastructure. The driver or user can then leave the vehicle and the vehicle can then be parked autonomously.

The method is thus a method for self-localization of a fully autonomously drivable vehicle, also known as a self-driving vehicle. In other embodiments, however, the vehicle is not necessarily configured for fully autonomous driving. For example, the self-localization can then be used for partially autonomous driving functions or for driver assistance.

A landmark can be understood to be features and/or patterns in an environment, which can be identified and matched up with at least certain place information or position information. These may be, for example, characteristic points or objects which are situated at particular positions in the environment.

A landmark can be assigned to a landmark type, especially on the basis of one or more geometrical and/or semantic attributes of the landmark. Thus, for example, road markings, lane markings, other ground marking lines, the edges or corners of buildings, masts, posts, traffic, information, or other signs, buildings, elements of vegetation, buildings or portions thereof, portions of traffic control systems, two-dimensional codes such as QR codes or barcodes, alphanumerical expressions and so forth are each defined as landmark types. A landmark can also be assigned to multiple landmark types.

The matching up of the first pose with the at least one preferred sensor type or the at least one dominant landmark type can be understood to be a matching up of the environment of the vehicle, when it is located at the first position of the first pose, with the at least one preferred sensor type or the at least one dominant sensor type.

The environment sensor device comprises at least two environment sensor systems, namely, the first environment sensor system and a second environment sensor system. The second environment sensor system is configured according to a second sensor type, the second sensor type being different from the first sensor type.

In general, the first environment sensor system and the second environment sensor system may be activated when generating the environment sensor data, and optionally further environment sensor systems of the environment sensor device can also be activated. Accordingly, the environment sensor data generally contain, besides the first portion, also a second portion which has been generated by means of the second environment sensor system.

However, the second portion of the environment sensor data is not used for the detecting of the landmark. In other words, the landmark is determined independently of the second portion of the environment sensor data.

The at least one computer unit contains a first detector module, which is a software module and which implements and saves the first landmark detection algorithm in memory. The first detector module is thus activated for the detecting of the landmark.

The at least one computer unit also contains in particular a second detector module, which is a software module and which implements and saves the second landmark detection algorithm in memory. The second landmark detection algorithm is adapted to the landmark detection based on a second portion of the environment sensor data, which has been generated by means of a second environment sensor system of the environment sensor device configured according to a second sensor type. The second detector module, however, is not activated for the detecting of the landmark, or it is deactivated for the detecting of the landmark.

A landmark detection algorithm can generally be understood to be an algorithm which is adapted to identify one or more landmarks on the basis of sensor data, especially that of one or more environment sensor systems, and to determine their position with respect to the particular environment sensor system, especially with respect to the vehicle, and optionally to classify the landmark. A landmark detection algorithm can be designed in particular as an algorithm for automatic perception, such as an algorithm for automatic visual perception.

The first and the second landmark detection algorithm differ from each other in that they are designed to detect the landmark based on different sensor data, i.e., based on sensor data of environment sensor systems which are configured according to different sensor types. While the first landmark detection algorithm may be designed, for example, for the landmark detection based on camera pictures or lidar point clouds, the second landmark detection algorithm may be designed, for example, for the landmark detection based on radar data, or vice versa. However, other groupings and sensor types or kinds of sensor data are also possible.

Algorithms for automatic visual perception, also known as computer vision algorithms, algorithms for machine vision or machine vision algorithms, can be considered to be computer algorithms for automatic performance of a visual perception task. A visual perception task, also known as a computer vision task, can be understood to be a task for the extraction of information from image data. In particular, the visual perception task can in theory be performed by a human being who is able to visually perceive a picture corresponding to the image data. In the present context, however, visual perception tasks are also performed automatically, without requiring the assistance of a human being.

A computer vision algorithm can contain, for example, an image processing algorithm or an algorithm for image analysis, which is or has been trained by machine learning and which can be based on an artificial neural network, especially a convoluted neural network. For example, the computer vision algorithm may comprise an object recognition algorithm, an obstacle recognition algorithm, an object tracking algorithm, a classification algorithm and/or a segmentation algorithm.

Corresponding algorithms can also be carried out analogously on the basis of input data other than pictures which are visually perceivable by a human being. For example, point clouds or images of infrared cameras, lidar systems, etc., can also be evaluated by means of suitably adapted computer algorithms. Strictly speaking, the corresponding algorithms are not algorithms for visual perception, since the corresponding sensors can operate in regions which are not visually perceivable, i.e., to the human eye, such as the infrared region. Therefore, such algorithms may be called algorithms for automatic perception. Algorithms for automatic perception thus encompass algorithms for automatic visual perception, but are not limited to these in regard to a human perception. Consequently, an algorithm for automatic perception by this understanding can comprise a computer algorithm for automatic performance of a perception task, for example, one which is or has been trained by machine learning and which can be based in particular on an artificial neural network. For example, the computer vision algorithm may comprise an object recognition algorithm, an obstacle recognition algorithm, an object tracking algorithm, a classification algorithm and/or a segmentation algorithm Object detection algorithms, object tracking algorithms, classification algorithms and/or segmentation algorithms, such as semantic segmentation algorithms, may also belong to such generalized algorithms for automatic perception.

If an artificial neural network is used to implement an algorithm for automatic visual perception, one architecture which is often used is that of a convoluted neural network, CNN. In particular, a 2D-CNN can be applied to corresponding 2D camera images. CNNs can also be used for other algorithms for automatic perception. For example, 3D-CNNs, 2D-CNNs or 1D-CNNs can be applied to point clouds, depending on the spatial dimensions of the point cloud and the details of the processing.

The result or output of an algorithm for automatic perception is dependent on the specific underlying perception task. For example, the output of an object recognition algorithm may contain one or more border boxes, defining a spatial position and optionally an orientation of one or more corresponding objects in the environment and/or corresponding object classes for the one or more objects. A semantic segmentation algorithm which is applied to a camera image can contain a class on the pixel level for each pixel of the camera image. Similarly, a semantic segmentation algorithm which is applied to a point cloud can contain a corresponding point level class for each of the points. The classes on the pixel level or on the point level can define an object type to which the respective pixel or point belongs.

The at least one preferred sensor type comprises in particular the first sensor type and not the second sensor type. The at least one sensor type corresponds to one or more sensor types which are especially well suited according to experience, such as has been determined during previous analysis drives, for the self-localization in the corresponding environment area of the first pose or first position. Which particular sensor type is involved can be determined in advance, for example by detecting and classifying the landmark and various other landmarks in the parking infrastructure, so that each time a corresponding landmark type and an associated preferred sensor type can be matched up with them. In particular, each landmark type is matched up with at least one sensor type. In this way, the at least one computer unit, when the assignment instruction consulted from the storage medium matches up the first pose with the at least one dominant landmark type, can deduce the corresponding preferred sensor type or at least one corresponding preferred sensor type.

The assignment instruction can be stored for example as part of the digital map, in particular as an additional map layer. Thus, for example, a corresponding match can be found for any given position or pose in the entire region of the parking infrastructure.

The activating of the first detector module can be understood to mean also a leaving of the first detector module activated, if the first detector module is already activated at the corresponding time. Similarly, the deactivating of the second detector module can also mean leaving the second detector module deactivated, if the second detector module is already deactivated at the corresponding time.

An environment sensor system can generally mean a sensor system which is capable of generating environment sensor data or sensor signals, depicting, representing, or otherwise reproducing the environment of the vehicle or the environment sensor system. For example, cameras, radar systems, lidar systems or ultrasound sensor systems can be understood to be environment sensor systems.

A sensor type can accordingly mean the specific configuration of the particular environment sensor system as a camera, radar system, lidar system or ultrasound sensor system. Depending on the embodiment of the method, an even more detailed differentiation can be done for different sensor types, such as different cameras, like cameras working in the visible range or the infrared range, and so forth, different radar systems, which are particularly sensitive for example in the near range or in the far range, different lidar systems, such as laser scanner or flash lidar systems, and so forth. In other embodiments, a more coarse division among different sensor types can also be considered, for example according to the physical phenomena detected. Thus, for example, optical sensor systems can be distinguished from sensor systems which are sensitive to radio waves or those which are sensitive to ultrasound waves, and so forth. A combination of different categorizations is also possible.

The activation of the first detector module and/or the deactivation of the second detector module need not occur abruptly or at the same time. Instead, it is possible to provide a fading out, so that in a transitional period of time both detector modules, i.e., the first and the second detector module, are activated and used for the self-localization. Neither is it necessarily required for the activation of the first detector module and/or the deactivation of the second detector module or the fading out to occur immediately after consulting the assignment instruction. For example, the assignment instruction can also be consulted proactively at an earlier time, so that the vehicle computer unit has more time available for planning the activation, deactivation, or fading out.

Finally, the assignment instruction is also not necessarily the only condition and/or the only basis for activating the first detector module or deactivating the second detector module. In particular, further boundary conditions can go into the decision making, such as a current speed of the vehicle or an accuracy or minimum accuracy needed for the self-localization.

Thus, thanks to the use of the matching up of the at least one preferred sensor type, directly through the matching up of the first pose with the at least one preferred sensor type using the assignment instruction or indirectly through the matching up of the first pose with the at least one dominant landmark type, it is possible to activate only those detector modules, especially during the self-localization, which can offer with high probability a relatively large benefit for the self-localization, because corresponding landmarks or features are present in the corresponding environment of the first pose. By contrast with the continuous parallel operation of all available detector modules, computing resources are saved by the techniques described herein. These saved computing resources can be used for other computing tasks. Especially in the context of self-driving vehicles or highly automated vehicles and the limited computing capacity of the systems often employed there, the embodiments described herein can be especially advantageous.

According to at least one embodiment of the method, the second landmark detection algorithm, which is adapted for the landmark detection on the basis of the second portion of the environment sensor data, is deactivated in dependence of the assignment instruction. In other words, the second detector module is deactivated in dependence of the assignment instruction.

The deactivating of the second detector module does not necessarily imply the deactivating of the second environment sensor system. In particular, the first and the second environment sensor system, and optionally further environment sensor systems of the environment sensor device, can be activated in order to generate the environment sensor data. In other words, both the first portion and the second portion of the environment sensor data are generated. While the first portion is used for the detection of the landmark, the second portion is not used for the detection of the landmark. The second portion of the environment sensor data may however be used for other purposes, such as for one or more safety functions, like an emergency braking function, a spacing control function, a lane-keeping assist function, and so forth.

For example, a driving function for automatic or partly automatic driving of the vehicle or a driver assist function can be carried out in dependence on the second portion of the environment sensor data.

The first and the second portion of the environment sensor data can also be recorded as respective data streams. The data streams are then generated more or less continuously or quasi-continuously, in the sense of successive single images or frames.

In particular, a further algorithm, such as a further algorithm for automatic perception, can be applied to the second portion of the environment sensor data. Depending on the result of the further algorithm, the at least one computer unit can generate at least one control signal for the at least partly automatic driving of the vehicle. The at least one control signal can be sent, for example, to one or more actuators of the vehicle, which can bring about the at least partly automatic driving of the vehicle.

According to at least one embodiment, the first environment sensor system comprises an optical sensor system or consists of the optical sensor system. For example, the second environment sensor system comprises a radar system or consists of the radar system.

An optical sensor system can mean a sensor system based on the detection of light, where light here may involve both visible light as well as electromagnetic waves in the infrared or ultraviolet spectrum. In other words, an optical sensor system comprises at least one optical detector. Cameras or lidar systems in particular constitute optical sensor systems.

Such embodiments are particularly advantageous when corresponding visible landmarks or those which are detectable with infrared light are present in the environment of the first pose, which can be used for the self-localization and in particular for the determination of the second pose, yet which cannot be detected with the use of radar systems, or not with adequate reliability. For example, this generally applies to road markings, parking place markings or other marking lines, or intersections of road marking lines, and so forth. Moreover, this also applies to landmarks whose semantic content is required for the definition or the distinct identification of the landmark. For example, the meaning of a traffic sign or an information sign or a warning sign and so forth can be determined with the aid of a camera or some other optical sensor system, possibly with a follow-up segmentation or detection algorithm, whereas this is hardly possible, or not possible, with a radar system.

Thus, in some embodiments, the second detector module for landmark detection based on data of the radar system is deactivated, since it offers no major advantage for the self-localization.

According to at least one embodiment in which the first environment sensor system contains the optical sensor system or consists of it, the landmark is at least one ground marking line or at least one intersection of a ground marking line. In other words, the at least one ground marking line or the at least one intersection of the at least one ground marking line is detected as the landmark.

According to at least one embodiment, the first environment sensor system comprises a radar system or consists of the radar system. For example, the second environment sensor system comprises an optical sensor system or consists of the optical sensor system.

Such embodiments are especially suitable when landmarks are mainly present in the environment of the first pose such as cannot be detected by means of an optical sensor system, or not reliably detected, but which can be detected by a radar system. For example, metallic structures which might be entirely or partly concealed by other objects can be reliably recognized by radar systems, whereas such is not the case with optical sensor systems. Such metallic structures might for example be integrated in or on walls or other building parts According to at least one embodiment in which first environment sensor system contains a radar system or consists of a radar system, the landmark comprises at least one metallic structure or a building wall or part of a building wall. In other words, the at least one metallic structure or the building wall or part of the building wall is detected as the landmark.

According to at least one embodiment, a current speed of the vehicle is determined, for example, by means of a velocity sensor of the vehicle. The first portion of the environment sensor data is determined in dependence on the current speed, in particular, the first detector module is activated in dependence on the current speed.

For example, the second detector module is deactivated in dependence on the current speed.

Thanks to the additional consideration given to the current speed, one can deal with the circumstance that certain sensor systems or the environment sensor data generated with them are especially reliable when the vehicle is at standstill or moving at low speed, but might not be so at greater speed. Thus, this can further enhance the reliability of the self-localization.

According to at least one embodiment, the first portion of the environment sensor data is determined in dependence on a given localization accuracy. In particular, the first detector module is activated in dependence on the given localization accuracy.

For example, the second environment sensor system is deactivated in dependence on the given localization accuracy.

The localization accuracy can be, for example, a nominal accuracy for the localization or for the determination of the second pose or a predetermined minimum accuracy for the localization of the second pose.

In such embodiments, it is possible to avoid environment sensor systems, especially the second environment sensor system, being deactivated because it might only make a small contribution to the self-localization, even though it may still lead to a higher overall accuracy of the localization. These embodiments thus make possible a balancing between the energy consumption and the localization accuracy.

According to at least one embodiment, an analysis drive is carried out in the parking infrastructure by means of the vehicle in order to determine the assignment instruction, wherein the first detector module is activated and the second detector module is activated during the analysis drive.

The analysis drive takes place in particular before the determination of the first and the second pose. During the analysis drive, the vehicle can thus determine the nature and location of the landmark and possibly other landmarks present in the parking infrastructure and thus create or update the assignment instruction. In other words, the additional map layer with the assignment instruction is created in this way. The analysis drive need not necessarily be a drive carried out solely for the purpose of determining the assignment instruction, but rather it may involve a normal usage of the vehicle in the parking infrastructure. Thus, the analysis drive, or possibly several analysis drives, can supplement the map layer having the assignment instruction with further assignment instructions and be built out step by step so that the embodiments described herein can be used in an ever increasing extent.

The analysis drive can be carried out additionally or alternatively in the parking infrastructure with a further vehicle. In particular, during the analysis drive, there is activated both a corresponding further first detector module and a corresponding further second detector module of the further vehicle. The above remarks concerning the environment sensor device, the first and the second environment sensor system and the first and second detector modules may apply analogously to a corresponding further environment sensor device of the further vehicle, a corresponding first and second environment sensor system of the further environment sensor device, and the first and second further detector module.

In particular, further environment sensor data are generated during the analysis drive of the vehicle by means of the environment sensor device. The first landmark detection algorithm and the second landmark detection algorithm are applied to the further environment sensor data in order to determine the assignment instruction.

In alternative embodiments, further environment sensor data are generated during the analysis drive of the vehicle by means of the environment sensor device. The first landmark detection algorithm and the second landmark detection algorithm are applied to the further environment sensor data in order to determine the assignment instruction.

Instead of determining the assignment instruction by means of the at least one computer unit or the at least one further computer unit, this can be determined based on the further environment sensor data also by a vehicle-external computer unit, such as a cloud computer unit or a cloud server and saved in memory, and relayed in particular to the vehicle.

According to at least one embodiment, the first environment sensor system is activated in dependence on the assignment instruction and the second environment sensor system is deactivated in dependence on the assignment instruction. The environment sensor data are generated by means of the first environment sensor system and in particular independently of the second environment sensor system. In other words, the environment sensor data contain the first portion, but not the second portion.

In this way, energy can be saved for the operation of the second environment sensor system.

It should be pointed out that the environment sensor device in various embodiments can contain one or more further environment sensor systems, besides the first and the second environment sensor system. The one or more further environment sensor systems can remain activated, for example, when the second environment sensor system is deactivated. In other words, the environment sensor data do not necessarily consist of only the first portion, if the second environment sensor system has been deactivated. Instead, the environment sensor data can contain one or more further portions which have been generated by means of the one or more further environment sensor systems. Depending on the assignment instruction, the one or more further portions can be used for the detection of the landmark. Alternatively, the landmark can be detected solely on the basis of the first portion of the environment sensor data.

In some embodiments, a sensor device for a vehicle is specified, especially a motor vehicle, such as a self-driving vehicle. The sensor device comprises an environment sensor device which is adapted to generating environment sensor data representing an environment of the vehicle, a storage medium which stores a digital map, and a control system which is adapted to determine a first pose of the vehicle in a map coordinates system of the digital map. The control system is adapted to detect, on the basis of the environment sensor data, a landmark in the environment and to determine a position of the landmark in the map coordinates system. The control system is adapted to determine a second pose of the vehicle in the map coordinates system dependent on the position of the landmark. The environment sensor device contains a first environment sensor system configured according to a first sensor type, which is adapted to generating a first portion of the environment sensor data. The control system is adapted to consult an assignment instruction stored on the storage medium, matching up the first pose with at last one preferred sensor type or at least one dominant landmark type. The control system is adapted to select the first portion of the environment sensor data in dependence on the assignment instruction for the detecting of the landmark and to apply a first landmark detection algorithm to the first portion of the environment sensor data.

The control system can comprise one or more computer units. In particular, the control system can comprise the at least one computer unit of the vehicle, which has already been described with regard to the various embodiments of the methods described herein, or vice versa.

Further embodiments of the sensor device will emerge from the different embodiments of the methods described herein and vice versa. In particular, a sensor device can be adapted to carry out a method as described herein, or it carries out such a method.

In some embodiments, an electronic vehicle guidance system for a vehicle is specified, comprising a sensor device as described herein.

An electronic vehicle guidance system can be understood to be an electronic system which is adapted to guide a vehicle fully automatically or fully autonomously, especially without needing the intervention of a driver in the control. The vehicle performs automatically all required functions, such as steering, braking and/or acceleration maneuvers, the observation and detecting of highway traffic, and appropriate responses. In particular, the electronic vehicle guidance system can implement a fully automatic or fully autonomous driving mode of the motor vehicle according to level 5 of the classification of SAE J3016. An electronic vehicle guidance system can also mean an "advanced driver assistance system" (ADAS), which supports the driver during partly automated or partly autonomous driving. In particular, the electronic vehicle guidance system can implement a partly automatic or partly autonomous driving mode according to levels 1 to 4 of the classification of SAE J3016. Here and in the following, "SAE J3016" refers to the corresponding standard in the version of June 2018.

The at least partly automatic vehicle guidance can therefore involve a guidance of the vehicle according to a fully automatic or fully autonomous driving mode of level 5 of SAE J3016. The at least partly automatic vehicle guidance can also involve a guidance of the vehicle according to a partly automatic or partly autonomous driving mode according to levels 1 to 4 of SAE J3016.

A computer unit can be understood to be in particular a data processing device; in particular, the computer unit can thus process data to carry out computational operations. These may also include operations to carry out indexed access to a data structure, such as a "look-up table" (LUT).

The computer unit can contain in particular one or more computers, one or more microcontrollers and/or one or more integrated circuits, such as one or more ASIC (application-specific integrated circuits), one or more field-programmable gate arrays (FPGA), and/or one or more SoC (systems on a chip). The computer unit can also contain one or more processors, such as one or more microprocessors, one or more processor units (CPU or central processing unit), one or more GPU (graphics processing unit) and/or one or more signal processors, especially one or more signal processors, especially one or more digital signal processors (DSP). The computer unit can also contain a physical or a virtual grouping of computers or other of the mentioned units.

In various embodiments, the computer unit comprises one or more hardware and/or software interfaces and/or one or more storage units.

In some embodiments, a motor vehicle having a sensor device as described herein and/or an electronic vehicle guidance system as described herein is also specified.

Embodiments of the invention also encompass combinations of features of the described embodiments.

DETAILED DESCRIPTION

Figure 1:
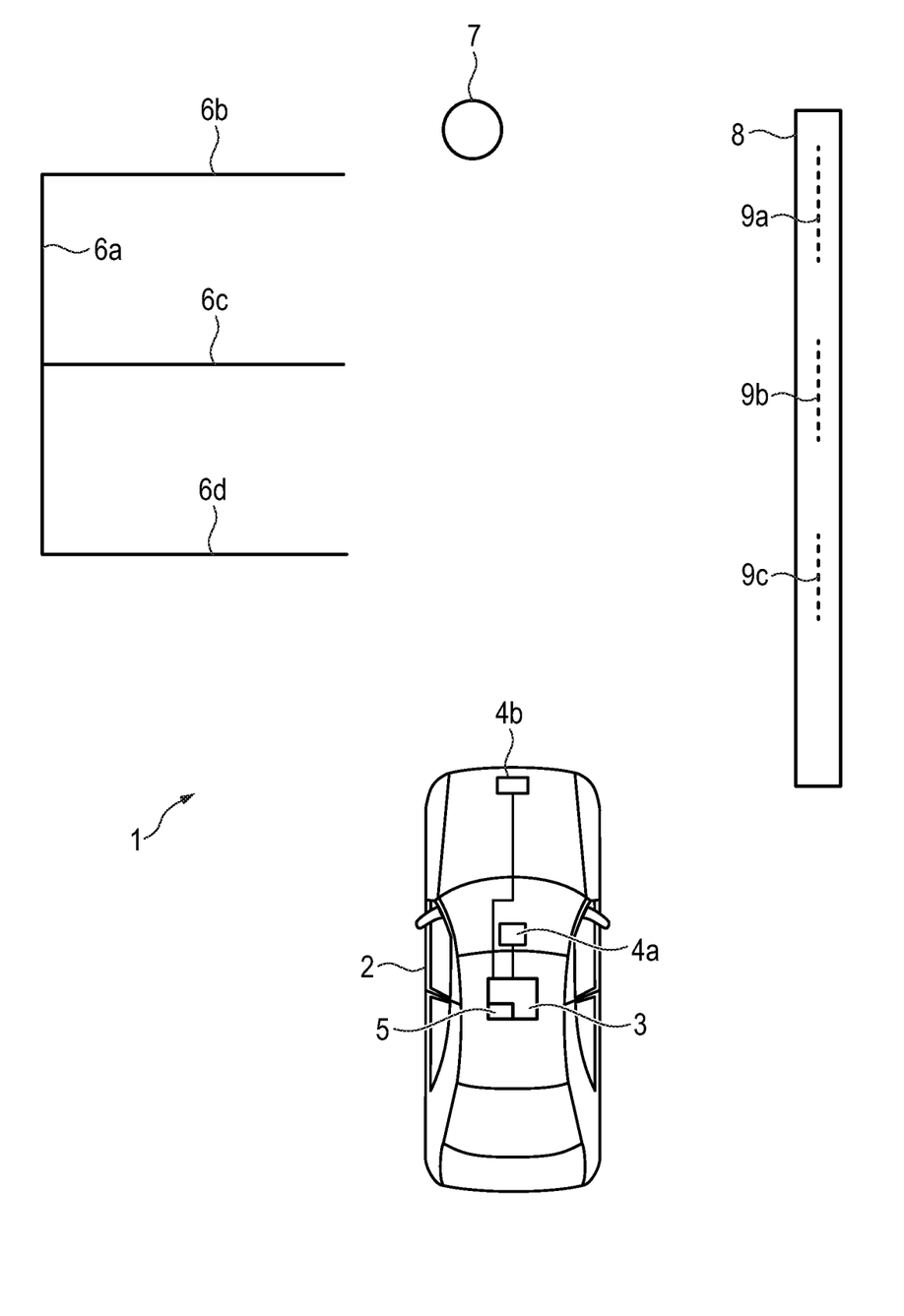
The FIGURE shows a schematic representation of an embodiment of a sensor device.

The embodiments explained in the following are example embodiments. In the described embodiments, the components described each represent individual features to be viewed independently of each other, which may also develop embodiments further independently of each other and therefore should also be viewed as part of embodiments of the invention individually or in a combination other than the one shown. Furthermore, the embodiments described can also be supplemented with other of the features already described.

The FIGURE shows schematically a motor vehicle 2, especially a self-driving motor vehicle, having an embodiment of a sensor device 1.

The sensor device 1 contains at least two environment sensor systems 4a, 4b, which are configured according to different sensor types. For example, the first environment sensor system 4a may be an optical sensor system, such as a camera, and the second environment sensor system 4b may be a radar system. However, other embodiments are not limited to the combination of these two sensor types, but instead can be used for any different sensor types.

The sensor device 1 furthermore comprises a control system 3 with a storage medium 5. The control system 3 may include one or more computer units of the vehicle and can serve for actuating the environment sensor systems 4a, 4b and for evaluating the environment sensor data generated by the environment sensor systems 4a, 4b.

The motor vehicle 2 is located in particular in a parking structure or infrastructure. For example, multiple different landmarks 6a, 6b, 6c, 6d, 7, 8, 9a, 9b, 9c in the parking infrastructure are shown. The landmarks 6a, 6b, 6c, 6d, 7, 8, 9a, 9b, 9c may correspond to different landmark types. For example, the landmarks 6a, 6b, 6c, 6d may involve ground marking lines or the like, such as those bounding off the parking places. The landmark 7 for example can be a post or a traffic sign or the like. The landmark 8 can be a wall or some other part of the building or part of some other structure. The landmarks 9a, 9b, 9c may be, for example, metallic structures integrated in the wall, such as steel girders or the like.

Depending on the landmark type, the different environment sensor systems 4a, 4b may be more or less suited to the detection of the corresponding landmarks 6a, 6b, 6c, 6d, 7, 8, 9a, 9b, 9c and thus to the self-localization of the vehicle 2.

By means of the sensor device 1, for example, a method for self-localization of the vehicle 2 in the parking infrastructure can be carried out. For this, at first a first pose of the vehicle 2 is determined in a map coordinates system of a digital map stored on the storage medium 5. For example, this can be done on the basis of environment sensor data which are generated by means of both environment sensor systems 4a, 4b. The environment sensor data can be compared against the digital map, so that a position and/or orientation of the vehicle 2 can be determined in the map coordinates system. For this, the control system 3 in particular can evaluate the environment sensor data in order to detect one or more of the landmarks 6a, 6b, 6c, 6d, 7, 8, 9a, 9b, 9c. Since the positions of the landmarks 6a, 6b, 6c, 6d, 7, 8, 9a, 9b, 9c are also stored in the digital map, the motor vehicle 2 can be localized accordingly.

In the control system 3 there is provided a first detector module, associated with the first environment sensor system 4a, which implements a first landmark detection algorithm. Likewise, there is provided in the control system 3 a second detector module, associated with the second environment sensor system 4a, which implements a second landmark detection algorithm. The first landmark detection algorithm is adapted such that it can detect landmarks based on environment sensor data which have been generated by means of the first environment sensor system 4a, i.e., for example, on the basis of camera images. The second landmark detection algorithm is adapted such that it can detect landmarks based on environment sensor data which have been generated by means of the second environment sensor system 4b, i.e., for example, on the basis of radar data.

The digital map, besides the position information regarding the landmarks 6a, 6b, 6c, 6d, 7, 8, 9a, 9b, 9c, also contains information regarding the respective landmark type of the landmarks 6a, 6b, 6c, 6d, 7, 8, 9a, 9b, 9c. For example, an additional map layer may be present, saving a corresponding assignment instruction for each position in the parking infrastructure, matching up the respective position with a dominant landmark type in the environment around the corresponding position. On the basis of the first pose determined for the vehicle 2, the control system 3 can accordingly consult the assignment instruction from the map and then for example arrange to activate the first detector module in dependence on the assignment instruction, while deactivating the second detector module in dependence on the assignment instruction.

The control system 3 can thus select a first portion of the environment sensor data, for example in dependence on the assignment instruction, which have been generated by means of the first environment sensor system 4a. The first detector module can then be applied to the first portion of the environment sensor data in order to detect a landmark and determine a second pose of the vehicle 2 on the basis of the landmark.

In the example described above, where the first environment sensor system 4a involves a camera and the second environment sensor system 4b involves a radar system, the assignment instruction can for example match up the pose determined for the vehicle 2 with the landmark type of the landmarks 6a, 6b, 6c, 6d, i.e., ground marking lines, for example. Since ground marking lines can be detected with high reliability by means of optical sensor systems such as a camera and be identified by means of the first landmark detection algorithm, whereas the detection of ground marking lines with the aid of radar data is difficult or impossible, the second detector module can be deactivated accordingly, without this leading to a significant loss of localization accuracy. In this way, the computing resources freed up can be used elsewhere.

It should be emphasized that the described scenario is only an example and in other situations other decisions can be made for the activation and/or deactivation of corresponding detector modules.

Thus, in particular, it is possible to verify continuously, during the driving of the vehicle 2 through the parking infrastructure and by comparing against the additional map layer, which detector modules in which area of the parking infrastructure should be activated or left activated and which detector modules can be deactivated.

Autonomous driving vehicles must use suitable sensors and algorithms to determine their position and orientation continuously and ascertain, by comparison with a digital map, that they are located in a passable area with no static obstacles. For this, a continuous detecting of the environment is done during the drive with suitable sensors such as cameras, radar and lasers. The resulting digital pictures are analyzed with the aid of suitable algorithms in order to recognize meaningful image contents, so-called features or landmarks, such as wall surfaces, edges, lines and line intersections, and to determine their position.

Since the quality of the analysis results may vary with the sensor type given the same boundary conditions, in general several types of sensors will be used in autonomous driving vehicles. This has the advantage that the vehicle position and orientation can still be calculated at every point and at every time in parking spaces in which the view is often impaired, as compared to public roads and highways. Thus, for example, it is possible in areas with many ground markings to visually detect enough lines and line intersections with the aid of camera systems and perform the calculation of the vehicle position and/or orientation on this basis. In areas with few ground markings, but many metallic structures, on the other hand, the edges and surfaces of these can be detected very well with radar, for example, and be used by the localization algorithm for determining the current vehicle position and/or orientation.

The detection results can be compared by a localization algorithm against information of a digital map which describes the landmark type as well as their positions within the parking space. On the basis of the position of the detected landmarks read out from the digital map, and taking into account the measured distance between the vehicle and the detected landmarks, the vehicle position and orientation within the parking space are determined.

In some embodiments, it is proposed to read out, during the autonomous or assisted driving through a parking infrastructure, the predominant anticipated type of the map entries in the upcoming route section, on the basis of landmark entries in a digital map, and to operate only the corresponding landmark detection algorithm for the detection of visual features or landmarks upon entering this route section, for example, while the landmark detection algorithm for radar detection of edges and surfaces of metallic structures is switched off.

Then, if the upcoming route section is followed by a route section with few visual landmarks but many metallic structures, after the transition from the upcoming route section to the next following route section the landmark detection algorithm for visual detection of features or landmarks will be switched off and the landmark detection algorithm for recognition of edges and surfaces of metallic structures with the aid of radar signals will be activated.

The demand for computing power, already reduced in this way as compared to a continuous parallel operation of both landmark detection algorithms, can be further reduced by performing, for route sections with predominant visual landmarks, in addition a determination of the primarily anticipated visual landmark type, while for route sections with predominant radar landmarks a corresponding determination of the primarily anticipated radar landmark type is performed.

As a result, it may happen for example that very many ground markings are to be expected in the form of parking place borders or corresponding line intersections, while vertical pillars and columns occur only in few numbers. For a route section with radar landmark dominance, it may happen for example that very many small-surface metal structures with clear edges and only a few large-surface metal structures without sharp borders are to be expected. If this information is also present in the digital map, it is possible in a route section with dominance of visual features or landmarks to switch off not only the radar landmark detection, but also the detection algorithms for not anticipated visual landmarks. Accordingly, it is possible in a route section with dominance of metallic structures to switch off not only the visual landmark detection, but also the detection algorithms for not anticipated radar landmarks. The activation and deactivation of the visual and radar-based localization as well as the detector modules may occur either in the form of a hard switching on and off or a soft fading out. In order to avoid gaps in the localization results and thus in the calculated vehicle position, the hard switching or alternatively the soft fading out can occur at points or within regions from which not only enough landmarks of the currently used type are still visible, but also already enough landmarks of the type used in the next route section are visible. The switching points, as well as the beginning and end of the fade out regions, can likewise be taken from the digital map.

Various embodiments also involve an automatic generating of the digital map or a supplementing of the digital map with the additional information on relevant landmark types or sensor types, for example on a cloud basis.

For this, during the driving of vehicles of a given fleet of vehicles through the parking infrastructure at first a detection is done for the existing features and landmarks and then a determination is made of the particular landmark type and the particular landmark position. Then, for example after leaving the parking infrastructure, an analysis can be done as to which landmark types occur more frequently in which areas of the parking infrastructure or represent the predominant portion of them.

As a further aspect, it is proposed to make an analysis, after leaving the parking infrastructure, of the places where an activation and deactivation of the respective environment sensor systems can be done for negligible gaps in the calculation of the vehicle position and orientation during the later use of the automatically generated expanded digital map for the self-localization. Also in order to make possible a soft fading in and out of the particular environment sensor systems instead of a hard switching on and off, after leaving the parking infrastructure an analysis can be done as to the positions where a fading out should be commenced and ended so that any gaps will be few in the calculation of the vehicle position and orientation during the later use.

Thus, for example, a cloud-based generating of an additional meta-data layer in a digital parking structure map can be produced with additional information. The additional information may involve the dominant landmark types within certain areas and information on the boundaries of the areas, favorable activation points for the environment sensor systems in an upcoming area, favorable deactivation points for the environment sensor systems in an area lying to the rear, and/or the beginning and end of favorable fading out areas for the environment sensor systems.

For example, it is possible to realize vehicles driving autonomously through parking structures which activate only the radar system and/or the algorithm for detection of radar landmarks in areas with dominant radar landmarks and which activate only the optical sensor systems and/or algorithms for the detection of visual landmarks in areas with a lot of visual landmarks. Thus, the required computing power, costs, and/or energy can be reduced.

German patent application no. 10 2021 117741.3, filed Jul. 9, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for self-localization of a vehicle in a parking structure, comprising:
   determining a first pose of the vehicle in a map coordinates system of a digital map stored on a storage medium,
   generating environment sensor data by an environment sensor device of the vehicle, representing an environment of the vehicle;
   based on the environment sensor data, detecting a landmark in the environment and determining a position of the landmark in the map coordinates system; and
   determining a second pose of the vehicle in the map coordinates system, dependent on the position of the landmark;
   consulting an assignment instruction stored on the storage medium, the assignment instruction matching the first pose with at least one preferred sensor type or at least one dominant landmark type;
   selecting, based on the assignment instruction, a first portion of the environment sensor data that was generated by a first environment sensor system of the environment sensor device configured according to a first sensor type,
   wherein, for the detecting of the landmark, a first landmark detection algorithm is applied to the first portion of the environment sensor data; and
   driving the vehicle based on the second pose and a second portion of the environment sensor data that was generated by a second environment sensor system of the environment sensor device configured according to a second sensor type that is different from the first sensor type.

2. The method according to claim 1, wherein a second landmark detection algorithm, adapted for landmark detection based on the second portion of the environment sensor data that was generated by the second environment sensor system of the environment sensor device configured according to the second sensor type, is deactivated in dependence on the assignment instruction.

3. The method according to claim 2, wherein:
   an analysis drive is carried out in the parking structure by the vehicle, wherein during the analysis drive further environment sensor data are generated by the environment sensor device and the first landmark detection algorithm as well as the second landmark detection algorithm are applied to the further environment sensor data in order to determine the assignment instruction; or
   an analysis drive is carried out in the parking structure by a further vehicle, wherein during the analysis drive further environment sensor data are generated by a further environment sensor device of the further vehicle and the first landmark detection algorithm as well as the second landmark detection algorithm are applied to the further environment sensor data in order to determine the assignment instruction.

4. The method according to claim 2, wherein:
   the first environment sensor system is activated in dependence on the assignment instruction and the second environment sensor system is deactivated in dependence on the assignment instruction; and
   the environment sensor data are generated by the first environment sensor system.

5. The method according to claim 1, wherein:
   the first environment sensor system is configured as an optical sensor system; and
   at least one ground marking line or at least one intersection of the at least one ground marking line is detected as the landmark.

6. The method according to claim 1, wherein:
   the first environment sensor system is configured as a radar system; and
   at least one metallic structure is detected as the landmark or a building wall or part of a building wall is detected as the landmark.

7. The method according to claim 1, wherein:
   a current speed of the vehicle is determined; and
   the first portion of the environment sensor data is determined in dependence on the current speed.

8. The method according to claim 1, wherein the first portion of the environment sensor data is determined in dependence on a given localization accuracy.

9. A sensor device for a vehicle, the sensor device comprising:
   an environment sensor device which, in operation, generates environment sensor data representing an environment of the vehicle,
   wherein the environment sensor device contains a first environment sensor system configured according to a first sensor type and a second environment sensor system configured according to a second sensor type that is different from the first sensor type, wherein the first environment sensor system, in operation, generates a first portion of the environment sensor data, and wherein the second environment sensor system, in operation, generates a second portion of the environment sensor data;

a storage medium which stores a digital map; and a control system which, in operation:

determines a first pose of the vehicle in a map coordinates system of the digital map;

based on the environment sensor data, detects a landmark in the environment and a determine a position of the landmark in the map coordinates system;

determines a second pose of the vehicle in the map coordinates system dependent on the position of the landmark, consults an assignment instruction stored on the storage medium, the assignment instruction matching the first pose with at least one preferred sensor type or at least one dominant landmark type;

selects, based on the assignment instruction, the first portion of the environment sensor data, wherein for detection of the landmark, a first landmark detection algorithm is applied to the first portion of the environment sensor data; and drives the vehicle based on the second pose and the second portion of the environment sensor data that was generated by the second environment sensor system of the environment sensor device.

* * * * *